United States Patent Office

3,487,690
Patented Jan. 6, 1970

3,487,690
ACOUSTICAL THERMOMETRY
John Frederick William Bell, London, and Eric George Herbert Mobsby, Dorset, England, assignors to United Kingdom Atomic Energy Authority, London, England
Filed Nov. 27, 1967, Ser. No. 685,880
Claims priority, application Great Britain, Dec. 6, 1966, 54,647/66
Int. Cl. G01k *1/00, 3/00, 13/00*
U.S. Cl. 73—339        2 Claims

ABSTRACT OF THE DISCLOSURE

An acoustic thermometer incorporates a temperature sensor in the form of solid body whose natural frequency of vibration is dependent upon temperature. The body terminates an acoustic line to which it is coupled via a region of high impedance. An electrosonic transducer launches bursts of oscillations into the line and the echo is monitored until resonance of the sensor is detected. The frequency of oscillations which comprise the burst which excites resonance in the sensor is used to provide a measure of the temperature of the sensor.

BACKGROUND OF THE INVENTION

This invention relates to acoustic thermometry. The term sonic as used herein applies to energy of sonic, subsonic and ultrasonic frequency.

SUMMARY OF INVENTION

According to the invention an acoustic thermometer incorporates a temperature sensor in the form of a solid body whose natural frequency of vibration is dependent upon its temperature. The sensor terminates an acoustic transmission line which may be up to about 20 feet in length and which may be in the form of a flexible wire a few thousandths of an inch in diameter or a rod as much as one quarter inch in diameter. The method of measuring temperature resides according to the invention in launching a burst of oscillations, say 30–40, at a controlled frequency into the line by means of a magnetostrictive, or other electroacoustic transducer and converting the echo returning from the sensor terminated end of the line back into an electrical signal and displaying that signal on an oscilloscope. When the frequency of the oscillations in the burst coincides with the resonant frequency of the sensor the return echo signal has a number of well defined characteristics. The frequency of the oscillations can be set very precisely to the resonant frequency by observing the echo signal whilst adjusting the oscillator control and hence by using previous calibration the temperature can be found. It will be noted that the temperature thus measured is that of the sensor alone and is completely independent of the temperature profile of the line. The choice of material and size of the components is generally selected to suit the environment and temperature in which the device is to be used.

DESCRIPTION OF PREFERRED EMBODIMENT

Figure 1:
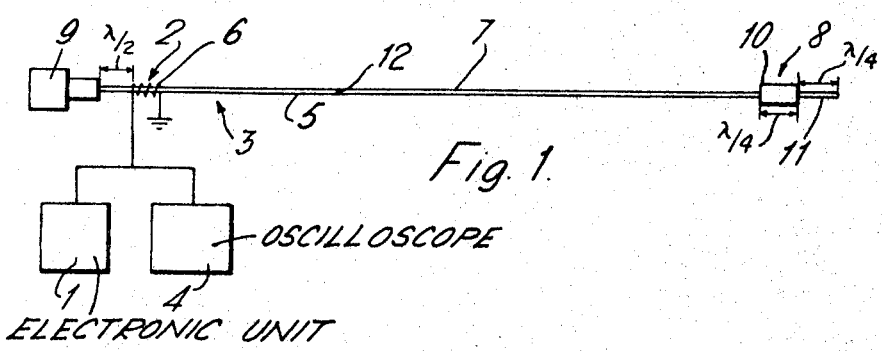
FIGURE 1 shows diagrammatically the principal parts of this acoustic thermometer.

In FIGURE 1 the temperature measuring device includes an electronic unit 1 for generating bursts of electrical oscillations, whose frequency is variable over the range 50–100 kHz. per second, a transducer 2 for receiving these oscillations and launching corresponding acoustic oscillations or waves into a probe 3 and an oscilloscope 4. The probe comprises a magnetostrictive wire 5, on which is wound the transmit/receive coil 6 of the transducer 2, an acoustically matched transmission line 7 and resonator unit 8 which terminates the line. The frequency of the oscillations in each burst is adjustable by the operator, as also is the duration of the burst. The resultant and corresponding bursts of sonic waves generated into the wire 5 travel axially along the wire in both directions. Those travelling rearwardly, i.e. towards the left as viewed in FIGURE 1, are reflected by a massive terminal block 9 which may incorporate the polarising magnet situated a distance $\lambda/2$ from the coil 6, where $\lambda$ is the mean sonic wavelength used. Those travelling forwardly are thus reinforced by the waves reflected from the block 9 and the two, superimposed, are injected into a transmission line 7, via the matched junction 12 between the wire 5 and the line 7. The coil 6 is also connected to an oscilloscope 4 for viewing echoes received on a cathode ray tube.

The transmission line 7 joins the wire 5 to the resonator unit 8. This latter is formed from one piece of material and includes a coupler constituting a high acoustic impedance region 10 at its junction with the transmission line. This region 10 is a $\lambda/4$ length of high impedance line and is contiguous with a $\lambda/4$ length of low impedance material which constitutes the actual temperature sensor 11. The echo signals which return to the transducer consist of the signals from the junction and from the resonator unit.

Figure 2A:
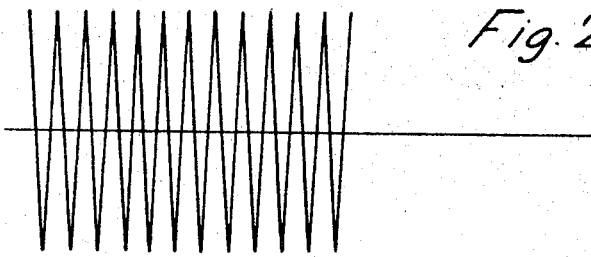
FIGURE 2a is an example of a burst of sonic waves such as are transmitted towards the temperature sensor.
Figure 2B:
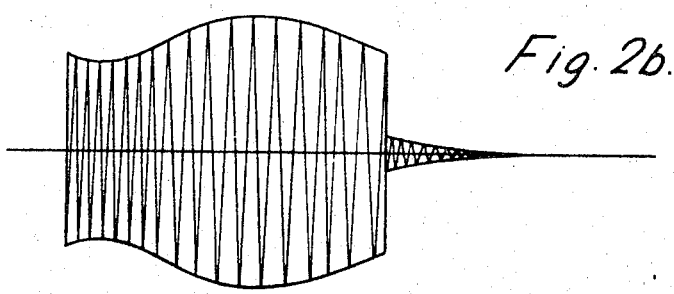
FIGURE 2b is a representation of the reflected echo as it appears at the transmitter when the frequency is some 10% off resonance.
Figure 2C:
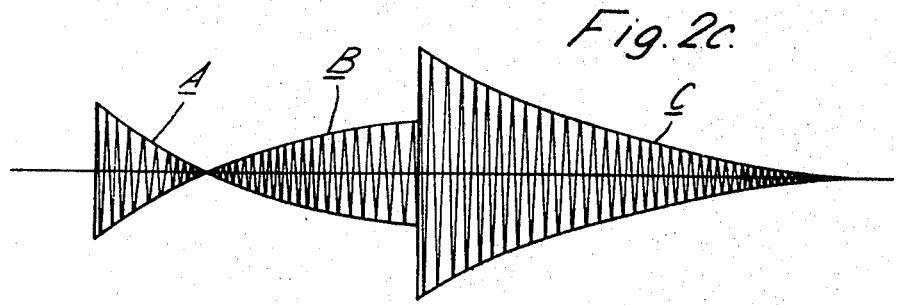
FIGURE 2c is a representation of the echo at resonance.

In the off-resonance condition, the contribution which the resonator unit 8 makes towards the echo signal is small and the echo is almost a replica of the transmitted signal as shown by a comparison of the transmitted signal FIGURE 2a and the echo FIGURE 2b received when the transmitted signal is 10% off resonance. When the frequency of the transmitted signal is equal to the resonant frequency, both contributions are of significance and of comparable magnitude. As shown in FIGURE 2c, there are three well defined regions to the echo at resonance designated A, B and C. The regions A and B have crossing exponential envelopes with a phase difference between the two regions. As can be seen from FIGURES 2b and 2c the phase difference occurs very rapidly near resonance. The region C shows the exponential decrement of the signal stored in the resonator.

The features which may be employed to indicate resonance are the null portion of the cross over between regions A and B or the maximum amplitude of region C. The null is a phase phenomena which could be used for the precision setting of an automated unit whilst the amplitude effect could be used for the general location of the resonance region. The procedure would then be to scan smoothly through the frequency range until a sharp increase in amplitude occurred and then, to adjust the frequency about this value until the null point be detected. The temperature corresponding to that frequency would then be read off a previously prepared chart. Alternatively, the frequency could be fed as data into a system control as the temperature term. The data, being in the form of a frequency, can be transmitted without degeneration over any suitable link and be readily converted into digital information for recording or use in the control of a system.

In order to obtain satisfactory sensitivity for the accurate detection of resonance, the acoustic coupling between the high impedance region and the low impedance material should be adjusted such that the internal acoustic energy losses within the low impedance material (i.e. the sensor) about equal the losses at the coupling, at the temperature at which it is intended to use the sensor. When this adjustment has been made then the Q of the sensor will be found to be as high as can be usefully employed and the resonant condition can be sharply indicated.

We claim:

1. An acoustic thermometer comprising a temperature sensor in the form of a solid body whose natural frequency of vibration is temperature dependent, a sonic energy transducer arranged to generate bursts of oscillations of predetermined frequency and transmit them via an acoustic line to the sensor, a coupler constituting of a region of high acoustic impedance between the line and the sensor such that echoes of the transmitted oscillations vary in accordance with the proximity to the resonant condition of the sensor and means for deriving a measure of temperature from the frequency at which resonance of the sensor occurs.

2. A method of performing acoustic thermometry which resides in exposing to the temperature to be measured a solid body whose natural frequency of vibration is dependent upon temperature, launching bursts of acoustic oscillations into a line coupled to the body via a high impedance region, adjusting the frequency of the oscillations in each burst until resonance of the body is detected and using a measure of that frequency to determine the temperature of the body.

References Cited

UNITED STATES PATENTS 3,350,942  11/1967  Peltola _____ 73—339

FOREIGN PATENTS 1,035,763  7/1966  Great Britain.

LOUIS R. PRINCE, Primary Examiner

D. E. CORR, Assistant Examiner

U.S. Cl. X.R.

73—362